United States Patent
Kaiser et al.

(10) Patent No.: US 11,692,053 B2
(45) Date of Patent: Jul. 4, 2023

(54) POLYMERIC POUR POINT DEPRESSANTS FOR WAXY CRUDE OILS

(71) Applicant: Clariant International, Ltd., Muttenz (CH)

(72) Inventors: Anton Kaiser, Muehldorf am Inn (DE); Michael Feustel, Koengernheim (DE); Christoph Kayser, Mainz (DE); Matthias Krull, Harxheim (DE); Michael Schaefer, Gruendau (DE); Rashod Smith, Houston, TX (US)

(73) Assignee: CLARIANT INTERNATIONAL LTD, Muttenz (CH)

( * ) Notice: Subject to any disclaimer, the term of this patent is extended or adjusted under 35 U.S.C. 154(b) by 157 days.

(21) Appl. No.: 17/236,635

(22) Filed: Apr. 21, 2021

(65) Prior Publication Data

US 2022/0363796 A1  Nov. 17, 2022

(51) Int. Cl.
*C08F 222/06* (2006.01)
*C10G 71/00* (2006.01)

(52) U.S. Cl.
CPC ............ *C08F 222/06* (2013.01); *C10G 71/00* (2013.01); *C10G 2300/302* (2013.01); *C10G 2300/304* (2013.01); *C10G 2300/4075* (2013.01)

(58) Field of Classification Search
CPC . C08F 222/06; C10G 71/00; C10G 2300/302; C10G 2300/304; C10G 2300/4075
See application file for complete search history.

(56) References Cited

U.S. PATENT DOCUMENTS

| 2017/0190949 A1 | 7/2017 | Solomon |
| 2018/0355266 A1 | 12/2018 | Garcia Castro |
| 2020/0369972 A1 | 11/2020 | Garcia Castro |

FOREIGN PATENT DOCUMENTS

| CA | 2593930 | * | 1/2008 | .............. C10L 10/14 |
| GB | 1245879 | | 9/1971 | |
| WO | 2017089212 | | 6/2017 | |
| WO | 2018190917 | | 10/2018 | |

OTHER PUBLICATIONS

International Search Report for PCT/EP2022/050529 dated Feb. 28, 2022, 3 pages.

* cited by examiner

*Primary Examiner* — Brian A McCaig
(74) *Attorney, Agent, or Firm* — Tod A. Waldrop

(57) ABSTRACT

This invention relates a wax inhibitor for hydrocarbon oils comprising an esterified copolymer having repeating structural units derived from an esterified ethylenically unsaturated dicarboxylic acid and α-olefins having at least 18 carbon atoms, whereof at least 3 mol-% of the α-olefins have 30 or more carbon atoms, and wherein the ethylenically unsaturated dicarboxylic acid has been esterified with a mixture of alcohols comprising
i) 70 to 97 mol-% of a saturated fatty alcohol having 18 to 24 carbon atoms and
ii) 3 to 30 mol-% of an unsaturated alcohol having 16 to 24 carbon atoms.

25 Claims, No Drawings

POLYMERIC POUR POINT DEPRESSANTS FOR WAXY CRUDE OILS

The present invention relates to polymer compositions for improving the flowability of waxy crude oils. The compositions contain a modified alpha-olefin maleic anhydride copolymer.

Crude oils and products produced therefrom are complex mixtures of different types of substances, some of which can present problems during production, transport, storage and/or further processing. For instance, crude oil and products derived therefrom, for example middle distillates, heavy heating oil, marine diesel, bunker oil or residue oils, comprise a variety of longer-chain paraffins with 20 to 45 and sometimes even more carbon atoms. Especially the linear paraffins pose problems as they have a limited solubility at low temperatures and, upon cooling of the oil, they precipitate as a solid wax and form a three-dimensional network of flakes and/or fine needles. As the liquid components of the oil get trapped in this network the flowability of the oil deteriorates. Thus, wax formation most often impedes the transportation of the oil through lines and pumps or even renders it impossible. A further problem encountered in production, transport and storage of wax-containing oils and especially of crude oils is the formation of deposits on the piping and other equipment contacted by the oil when the temperature falls below the solidification temperature of the wax. Build-up of wax deposits reduces the effective pipe diameter and impacts oil throughput. In storage tanks considerable amounts of oil remain intercalated between the paraffins which crystallize out especially on the tank walls. Besides, other constituents in crude oil, i.e., asphaltenes and resins, should also be considered as important factors influencing its cold flow behaviour.

To mitigate the detrimental effects of solid hydrocarbon waxes during production, transport and storage of paraffinic mineral oils, various types of additives have been developed. These additives are predominantly synthetic polymeric compounds. The so-called paraffin inhibitors improve the cold flowability of the oils, for example by modifying the crystal structure of the paraffins which precipitate upon cooling. Often, they prevent formation of a three-dimensional network of the wax crystals and thus diminish the flowability constraints at low temperatures. Usually this comes along with a lowering of the pour point of the paraffin-containing oils, a reduction of their viscosity and/or a reduction of the amount of deposits formed on interfaces as for example on pipeline and/or tank surfaces. The pour point is defined as the lowest temperature at which a sample of petroleum or a petroleum product will continue to flow when it is cooled under specified standard conditions. Standardized test methods for the measurement of the pour point are for example DIN ISO 3016, ASTM D97, ASTM D594 or ASTM D7346.

The chemistry of paraffin inhibitors suited for the treatment of crude oils and/or refined mineral oil products is widespread. The commercially most relevant types among them are either linear polymers or comb-shaped polymers. The former include paraffin-like polymethylene domains in the polymeric backbone which may co-crystallize with paraffins, such as ethylene-vinyl acetate copolymers (EVA) and ethylene-butene copolymers (PE-PEB); the latter have long alkyl chains (crystallizable appendages) appended to the backbone of the polymer, such as alkyl (meth)acrylate homo- and copolymers, alkyl esters of styrene-maleic anhydride copolymers, alkyl esters, amides and/or imides of α-olefin-maleic anhydride copolymers, alkyl fumarate-vinyl acetate copolymers, derivatives of alkyl (meth)acrylate-maleic anhydride copolymers, etc. Such polymers share the ability for interaction with the paraffins in their process of crystallization and aggregation in the oil. By co-crystallization with the paraffins the habit of the paraffin crystals is modified and the impact of the paraffin crystals on the flow properties of waxy oils is diminished.

A group of wax inhibitors well-proven during crude oil production, transportation and storage are so-called comb polymers. These include copolymers of maleic anhydride with α-olefins (MAO-copolymers) esterified with a fatty alcohol.

Accordingly, GB 1245879 discloses liquid hydrocarbon compositions such as crude oils and petroleum residual oils containing esters of 1-olefin maleic anhydride copolymers in which the olefins have at least 22 and preferably at least 30 carbon atoms per molecule and the ester is a behenyl ester comprising predominantly $C_{18}$ to $C_{22}$ alkyl groups. The copolymers reduce the pour point and the low-temperature viscosity of crude oils.

However, the comb polymers disclosed in GB 1245879 have a high solidification temperature and require heating and/or dilution with organic solvents to allow for their application in the oilfield. While the former requires energy and most often also changes in the infrastructure, for example heated conduits, the latter requires a huge amount of solvent which is costly and needs to be transported. Over the past years new oilfields have been developed at locations where the solidification temperature of additives requires particular attention. For example, at remote locations with poor infrastructure heating is often not viable and cost of transportation of highly diluted additives renders their application inefficient. Furthermore, additives suitable for application in deepwater oil production, besides being liquid, may not form precipitates at low temperature (for example at about 4° C.) and often also under high pressure (for example at 70 MPa and higher) to make sure they will not block the umbilical pipe. Although extensive dilution may result in a low pour point of these additives this does not necessarily ensure stability of the additive for a longer time as for example over longer shut-in periods.

WO 2017/089212 relates to comb copolymers comprising structural units derived from α-olefins having $C_{14}$ to $C_{50}$ alkyl chains, at least two different olefinically unsaturated dicarboxylic acid esters, and optionally maleic acid and/or maleic anhydride. The olefinically unsaturated dicarboxylic acid esters are, first, esters having a linear $C_{18}$ to $C_{50}$ alkyl group and, second, esters having a short-chain linear, a branched or a cyclic alkyl group, or esters having an aromatic group. Exemplified polymers are α-olefin-maleic anhydride copolymers partially esterified with a mixture of linear and branched respectively linear and cyclic alcohols, all being saturated. The invention further relates to the use of the copolymers as pour point depressant for crude oil, mineral oil, and/or mineral oil products, preferably as pour point depressant for crude oil.

WO 2018/190917 discloses an oil composition comprising a wax inhibitor that includes at least one modified alpha-olefin maleic anhydride copolymer wherein the alpha-olefin has a hydrocarbyl group containing 6 to 12 carbon atoms and the polymer is (partially) esterified with alcohols containing a hydrocarbyl group containing 12 to 60 carbon atoms and wherein the alcohols have an average carbon atom number in a range of from 20 to 32. The ester side chains may be any combination of optionally substituted straight-chain, branched-chain, or cyclic alkyl, alkenyl, alkynyl, or aryl groups. According to the teaching of WO 2018/190917, the hydrocarbyl side chain (stemming from the olefin used for synthesizing the copolymer) is more critical to low temperature stability whereas the ester side chain (stemming from the alcohols for synthesizing the copolymer) is more critical to the wax inhibiting performance of a modified olefin-maleic anhydride copolymer. Accordingly, a modified olefin-maleic anhydride copolymer that includes relatively short hydrocarbyl side chains and relatively long ester side chains can achieve a balance of both good wax inhibiting performance and low temperature stability. Example 9 of WO 2018/190917 discloses a dodecene-maleic anhydride copolymer esterified with a mixture of linear $C_{18}$ to $C_{30}$ alcohols comprising 13 mol-% of oleyl alcohol. This polymer is shown to be stable in the cold centrifuge test for 6 hours at 4° C. as a 15 wt.-% solution in xylene. However, in contrast to other examples a 20 wt.-% solution of this polymer fails the cold centrifuge test.

However, the recent approaches for the design of wax inhibitors which address the handleability of wax inhibitors for example for deepwater applications sacrifice at least part of the wax inhibiting performance in favor of low temperature stability. Accordingly, such additives require higher dosage rates than conventional additives as for example those disclosed in GB 1245879. This deficiency comes along with an extenuated performance especially in waxy crude oils. Especially problematic waxy crude oils are those having a saturates content of 50 wt.-% and more and especially of 70 wt.-% and more, the saturates content being determined by SARA analysis according to IP 469.

Accordingly, there is a need for wax inhibitors with high effectiveness in waxy crudes and concurrently having favorable low temperature properties including low temperature flowability and no segregation of solids. They shall be suited for treatment of a wide range of crude oils and especially for waxy crudes with economically reasonable efforts even in remote locations, including deepwater oil production. Particularly it is an object of the invention to provide improved α-olefin-maleic anhydride copolymers for use as wax inhibitor for hydrocarbon oils. Their effectiveness should be approximate to the wax inhibitors disclosed in GB 1245879, while concurrently having a favorable rheology and stability at low temperatures. An improved effectiveness of the wax inhibitor may allow for achieving a lower pour point temperature with the same dosage rate or for achieving the target temperature with a lower dosage rate, both in comparison to the polymers according to the state of the art.

Surprisingly it was found that more effective wax inhibitors having a lower solidification temperature and an improved stability at low temperatures are obtained when a copolymer of an ethylenically unsaturated dicarboxylic acid or its anhydride and a mixture of long-chain α-olefins is esterified with a mixture of essentially saturated fatty alcohols having 18 to 24 carbon atoms and an unsaturated alcohol having 16 to 24 carbon atoms. Such esterified copolymers which have long hydrocarbyl side chains and at the same time unsaturated ester side chains exhibit both, good wax inhibiting performance and good low temperature properties. They are particularly applicable as a wax inhibitor for the treatment of waxy crude oils and/or in deepwater oil production and transportation.

In a first aspect the invention thus provides a wax inhibitor for hydrocarbon oils comprising a copolymer having repeating structural units derived from an esterified ethylenically unsaturated dicarboxylic acid and α-olefins having at least 18 carbon atoms, whereof at least 3 mol-% of the α-olefins have 30 or more carbon atoms, and wherein the ethylenically unsaturated dicarboxylic acid has been esterified with a mixture of alcohols comprising i) 70 to 97 mol-% of a saturated fatty alcohol having 18 to 24 carbon atoms and
ii) 3 to 30 mol-% of an unsaturated alcohol having 16 to 24 carbon atoms.

In a second aspect the invention provides the use of a wax inhibitor according to the first aspect of the invention for reducing one or more of pour point, viscosity, yield stress and wax deposition of a hydrocarbon oil.

In a third aspect the invention provides a method of reducing one or more of pour point, viscosity, yield stress and wax deposition of a hydrocarbon oil, the method comprising the addition into said oil of an effective amount of a wax inhibitor according to the first aspect of the invention.

In a fourth aspect the invention provides a process for manufacturing a wax inhibitor according to the first aspect of the invention, wherein an ethylenically unsaturated dicarboxylic acid or its anhydride and α-olefins having at least 18 carbon atoms, whereof at least 3 mol-% of the α-olefins have 30 or more carbon atoms, are copolymerized in the presence of a radical chain initiator and the copolymer is subsequently esterified with a mixture of alcohols comprising i) 70 to 97 mol-% of a saturated fatty alcohol having 18 to 24 carbon atoms and
ii) 3 to 30 mol-% of an unsaturated alcohol having 16 to 24 carbon atoms.

In a fifth aspect the invention provides a process for manufacturing a wax inhibitor according to the first aspect of the invention, wherein an ethylenically unsaturated dicarboxylic acid or its anhydride is esterified with a mixture of alcohols comprising i) 70 to 97 mol-% of a saturated fatty alcohol having 18 to 24 carbon atoms and
ii) 3 to 30 mol-% of an unsaturated alcohol having 16 to 24 carbon atoms, and wherein the ester is subsequently copolymerized with α-olefins having at least 18 carbon atoms, whereof at least 3 mol-% of the α-olefins have 30 or more carbon atoms, in the presence of a radical chain initiator.

In a sixth aspect the invention provides a method of reducing the pour point and/or the viscosity of a wax inhibitor which is a copolymer having esterified repeating structural units derived from an ethylenically unsaturated dicarboxylic acid or its anhydride and α-olefins having at least 18 carbon atoms, whereof at least 3 mol-% of the α-olefins have 30 or more carbon atoms, wherein prior to esterification of the ethylenically unsaturated dicarboxylic acid, its anhydride and/or the copolymer with a saturated fatty alcohol having 18 to 24 carbon atoms, 70 to 97 mol-% of the saturated fatty alcohol having 18 to 24 carbon atoms are admixed with 3 to 30 mol-% of an unsaturated alcohol having 16 to 24 carbon atoms.

In a seventh aspect the invention provides an oil composition comprising a hydrocarbon oil and an effective amount of a wax inhibitor according to the first, fourth or fifth aspect of the invention.

In a preferred embodiment, the wax inhibitor according to the invention comprises one or more of the repeating structural units of formulae (2) and/or (3)

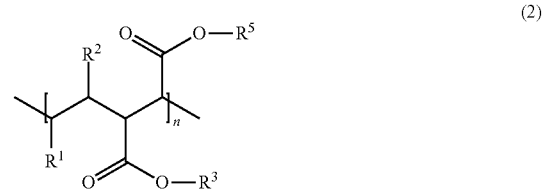

-continued

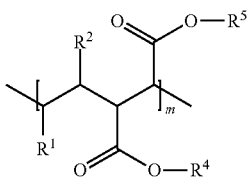
(3)

wherein
one of $R^1$ and $R^2$ is hydrogen and the other one is selected from alkyl groups containing at least 16 carbon atoms and wherein at least 3 mol-% of the alkyl groups have 28 or more carbon atoms,
n is an integer ranging from 2 to 98
m is an integer ranging from 2 to 98,
n+m is an integer from 5 and 100,
$R^3$ is an alkyl group having from 18 to 24 carbon atoms,
$R^4$ is an alkenyl group having from 16 to 24 carbon atoms, and
$R^5$ is selected from hydrogen, $R^3$ and $R^4$,
wherein the molar portion of the groups $R^4$ in respect to the sum of the groups $R^3$ and $R^4$ is between 3 and 30 mol-% and the molar portion of the groups $R^3$ in respect to the sum of the groups $R^3$ and $R^4$ is between 97 and 70 mol-%.

Specifically, when $R^5$ is hydrogen, formulae (2) and (3) represent half esters of the dicarboxylic acid. When $R^5$ is an alkyl group $R^3$ or an alkenyl group $R^4$, formulae (2) and (3) represent di-esters (full-esters) of the dicarboxylic acid. In formulae (2) and (3), the meaning of $R^5$ may be the same or different. In formulae (2) and (3), the meaning of $R^5$ is independent from the meaning of $R^3$ respectively $R^4$. Similarly, the meanings of $R^1$ and $R^2$ are independent from the meanings of $R^3$, $R^4$ and $R^5$.

Additionally, the wax inhibitor may further comprise minor amounts of repeating structural units of formulae (4) and/or (5)

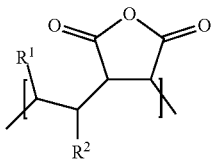
(4)

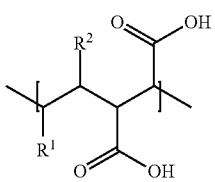
(5)

wherein
$R^1$ and $R^2$ have the meanings given above.

In a preferred embodiment, the content of repeating units according to formula (4) comprising anhydride groups and of repeating units according to formula (5) comprising diacid groups taken together is below 30 mol-%, more preferred between 1 and 20 mol-%, and especially preferred between 5 and 15 mol-%, as for example between 1 and 30 mol-%, or between 1 and 15 mol-%, or between 5 and 30 mol-%, or between 5 and 20 mol-%, based on the sum of the repeating structural units (2), (3), (4) and (5). Units according to formula (5) may be formed when water is present during esterification and/or a transesterification between units of formulae (2) and (3) occurs.

Optionally the esterified α-olefin-unsaturated dicarboxylic acid copolymer may comprise one or more further copolymerizable monomers being different from the ethylenically unsaturated dicarboxylic acid, its anhydride, its ester and the α-olefins. The optional further monomers are preferably selected from the group consisting of esters of acrylic acid or methacrylic acid, vinyl alkanoates, allyl compounds, vinyl ethers, N-vinyllactams, N-vinylimidazoles, ethylenically unsaturated aromatics, or a mixture of such monomers.

In a preferred embodiment, a further monomer is present in the copolymer of the invention. In this case, the share of the further monomer(s) in the esterified α-olefin-unsaturated carboxylic acid copolymer is preferably from 0.1 to 30 mol-%, more preferably from 0.5 to 20 mol-% and especially preferred from 1 to 10 mol-%, as for example from 0.1 to 20 mol-%, or from 0.1 to 10 mol-%, or from 0.5 to 30 mol-%, or from 0.5 to 10 mol-%, or from 1 to 30 mol-%, or from 1 to 20 mol-% in respect to the content of α-olefin, esterified unsaturated dicarboxylic acid and the further monomer(s) in the wax inhibitor.

In a preferred embodiment, the wax inhibitor according to the invention is a low to medium molecular weight copolymer. It may be made by any of the methods known in the art, e. g., by mass polymerization or solution polymerization with free radical initiation. For example, the esterified α-olefin-unsaturated carboxylic acid copolymer may be manufactured by free radical copolymerization of a mixture of the α-olefins and an ethylenically unsaturated dicarboxylic acid or its anhydride followed by esterification with a mixture of the alcohols (i) and (ii). Similarly, it may be manufactured by free radical copolymerization of a mixture of the α-olefins with an ester of the ethylenically unsaturated dicarboxylic acid or its anhydride with a mixture of the alcohols (i) and (ii).

Preferred ethylenically unsaturated dicarboxylic acids and their anhydrides in the different aspects of the invention are maleic acid, fumaric acid, and maleic anhydride. Especially preferred is maleic anhydride.

In the context of this invention copolymers of maleic anhydride with α-olefins may be abbreviated as "MAO-copolymers". This term encompasses polymers comprising repeating structural units of formula (1)

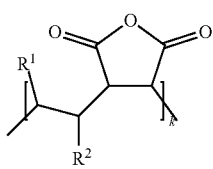
(1)

wherein
one of $R^1$ and $R^2$ is hydrogen and the other is selected from alkyl groups containing at least 16 carbon atoms and wherein at least 3 mol-% of the alkyl groups have 28 or more carbon atoms, and
k is an integer ranging from 5 to 100.

Accordingly, the term "esterified MAO-copolymers" refers to polymers comprising repeating structural units of formulae (2) and (3). Esterified MAO-copolymers include I) copolymers manufactured by esterification of a MAO-copolymer comprising repeating structural units if formula (1) with a mixture of alcohols comprising
   i) 70 to 97 mol-% of a saturated fatty alcohol having 18 to 24 carbon atoms and
   ii) 3 to 30 mol-% of an unsaturated alcohol having 16 to 24 carbon atoms,
   as well as
II) copolymers manufactured by esterification of an ethylenically unsaturated dicarboxylic acid with a mixture of alcohols comprising
   i) 70 to 97 mol-% of a saturated fatty alcohol having 18 to 24 carbon atoms and
   ii) 3 to 30 mol-% of an unsaturated alcohol having 16 to 24 carbon atoms,
and subsequent copolymerization of the ester with α-olefins having at least 18 carbon atoms and wherein at least 3 mol-% of the α-olefins have 30 or more carbon atoms.

The term alpha-olefin (or α-olefin, 1-olefin) refers to linear alkenes having a C═C double bond in the 1-position which often is also referred to as the alpha (α) position. Preferred α-olefins may have an even or an odd number of carbon atoms. Representative non-limiting examples of suited α-olefins include 1-octadecene, 1-nonadecene, 1-eicosene, 1-heneicosene, 1-docosene, 1-tricosene, 1-tetracosene, 1-pentacosene, 1-hexacosene, 1-octacosene, 1-triacontene, 1-dotriacontene, 1-tetratriacontene, 1-hexatriacontene, 1-octatriacontene, 1-tetracontene, 1-dotetracontene, 1-tetratetracontene, 1-hexatetracontene, 1-octatetracontene, and their mixtures.

In a preferred embodiment, the wax inhibitor according to the various aspects of the invention is an esterified copolymer of an ethylenically unsaturated dicarboxylic acid or its anhydride with a mixture of α-olefins wherein the α-olefins have from 18 to 50 carbon atoms and more preferably from 20 to 42 carbon atoms as for example from 18 to 42, or from 20 to 50 carbon atoms, and wherein at least 3 mol-% of the α-olefins have at least 30 carbon atoms as for example from 30 to 50 or from 30 to 42 carbon atoms.

In a preferred embodiment, the mixture of α-olefins comprises from 4 to 60 mol-%, more preferably from 7 to 40 mol-% and especially preferred from 8 to 30 mol-% as for example from 3 to 60 mol-%, or from 3 to 40 mol-%, or from 3 to 30 mol-%, or from 4 to 40 mol-%, or from 4 to 30 mol-%, or from 7 to 60 mol-%, or from 7 to 30 mol-%, or from 8 to 60 mol-%, or from 8 to 40 mol-% of α-olefins having 30 and more carbon atoms. In a further preferred embodiment, the content of α-olefins having more than 50 carbon atoms is preferably below 3 mol-% and more preferably below 1 mol-% of the mixture of α-olefins and especially preferred the mixture of α-olefins is essentially void of α-olefins having more than 50 carbon atoms.

Preferred α-olefin mixtures comprise at most 10 mol-%, more preferred at most 5 mol-% and especially preferred at most 3 mol-% of α-olefins having less than 18 carbon atoms. Often, commercially available higher α-olefins and especially higher α-olefin mixtures contain branched olefins, internal olefins, paraffins and other components. As they do not copolymerise under the given reaction conditions, their content is not considered in the calculation of the α-olefin content.

A MAO-copolymer as an intermediate for production of the wax inhibitor according to the invention can be manufactured by copolymerization of a mixture of α-olefin monomers with maleic anhydride in the presence of a radical chain initiator. As free-radical-initiated copolymerization of maleic anhydride and α-olefins results in essentially alternating copolymers, the monomers are preferably reacted in an essentially equimolar ratio. Higher contents of maleic anhydride may be achieved for example by grafting of further maleic anhydride onto the once formed alternating copolymer. Accordingly, in a preferred embodiment, the α-olefin is copolymerized with 0.2 to 2.0 molar equivalents, more preferably with 0.6 to 1.5 molar equivalents and especially preferred with 0.8 to 1.3 molar equivalents of maleic anhydride, as for example with 0.2 to 1.5 molar equivalents, or with 0.2 to 1.3 molar equivalents, or with 0.6 to 2.0 molar equivalents, or 0.6 to 1.3 molar equivalents, or with 0.8 to 2.0 molar equivalents, or with 0.8 to 1.5 molar equivalents of maleic anhydride. A surplus of any of the unreacted monomers may be removed from the polymer e.g. by distillation. Often it has been proven to be advantageous to leave unreacted monomers as for example unreacted α-olefins in the maleic anhydride-α-olefin copolymer.

The copolymerization of maleic anhydride with the mixture of olefins can be accomplished by heating a mixture of the comonomers to a temperature of from 50° C. to 150° C., preferably from 80° C. to 120° C., as for example between 50 and 120° C., or between 80 and 150° C., and addition of a free radical polymerization initiator such as a dialkyl peroxide, a diacyl peroxide, a hydroperoxide, a peroxy ester, a peroxy ketal, a peroxydicarbonate, a peracid, or an azo initiator, as for example di-tert-amylperoxid, tert-butyl hydroperoxide, azobisisobutyronitrile (AIBN), di-benzoyl peroxide (DBPO), tert-butyl peroxy benzoate, tert-butyl-3,5,5-trimethylperoxyhexanoate (TBPIN), di-tert-butyl peroxide (DTBPO), dicumyl peroxide or any mixture thereof. Other free radical initiators useful in the context of the present invention are known to those skilled in the art in order to form a copolymer with the desired molecular weight. The addition of initiator may be carried out in one or more portions or continuously for example over a time span of for example from 5 minutes to 6 hours. In a preferred embodiment, the α-olefin and optionally part of the maleic anhydride are charged to a reaction vessel and the remainder of maleic anhydride is added to the vessel over a time span of from 5 minutes to 6 hours in portions or continuously. In a preferred embodiment, the remainder of maleic anhydride is added over essentially the same time span as the initiator.

In a preferred embodiment, the polymerization is made in the presence of a solvent. Preferred solvents are aprotic organic solvents such as aliphatic and/or aromatic hydrocarbons. The hydrocarbons may, for example, be saturated aliphatic hydrocarbons or mixtures thereof. These may be either paraffinic or naphthenic, i.e. saturated linear or cyclic hydrocarbons. The hydrocarbons may also be aromatic hydrocarbons or mixtures thereof as for example toluene, xylene, ethylbenzene, naphthalene and technical mixtures of aromatic hydrocarbons. Technical grade mixtures of aromatic solvents are commercially available, for example from the Shellsol® A or the Solvesso® series. In a preferred embodiment, the polymerization is made in the presence of an aliphatic and/or aromatic hydrocarbon having a boiling point of at least 175° C. and a flashpoint of at least 60° C. Preferably, the amount of solvent, if present, is between 5 and 60 wt.-%, more preferably between 10 and 50 wt.-% and especially preferred between 20 and 40 wt.-% as for example between 5 and 50 wt.-%, between 5 and 40 wt.-%, between 10 and 60 wt.-%, between 10 and 40 wt.-%, between 20 and 60 wt.-% or between 20 and 50 wt.-%, in respect to the sum of monomers, solvent and any further auxiliaries added to the batch.

Preferably, the resulting addition polymeric product has a number average molecular weight ($M_n$) of about 2,000 to 50,000 Dalton, or about 3,000 to 40,000 Dalton or preferably about 5,000 to 30,000 Dalton as determined by gel permeation chromatography in THF versus poly(styrene) standards.

In a preferred embodiment, the wax inhibitor according to the invention is a MAO-copolymer as described above which has been esterified with a mixture of alcohols comprising 70 to 97 mol-% of a saturated fatty alcohol (i) having the general formula (6)

$$R^3\text{—OH} \tag{6}$$

wherein
$R^3$ is an alkyl group having 18 to 24 carbon atoms,
and 3 to 30 mol-% of an unsaturated fatty alcohol (ii) having the general formula (7)

$$R^4\text{—OH} \tag{7}$$

wherein
$R^4$ in an alkylene group having 16 to 24 carbon atoms.

In a preferred embodiment, the mixture of alcohols (i) and (ii) comprises 75 to 95 mol-% of a saturated fatty alcohol (i) having 18 to 24 carbon atoms and 5 to 25 mol-% of an unsaturated alcohol (ii) having 16 to 24 carbon atoms.

The mixture of alcohols used for the esterification of the MAO-copolymer (1) may comprise a minor amount of alcohols having longer and/or shorter alkyl respectively alkenyl chains. In a preferred embodiment, the mixture of alcohols contains less than 15 mol-%, more preferred less than 10 mol-% and especially preferred less than 5 mol-% of alcohols having 26 or more carbon atoms. In a further preferred embodiment, the mixture of alcohols used for the esterification of the MAO-copolymer contains less than 7 mol-% and more preferred less than 5 mol-% and especially preferred less than 3 mol-% of saturated alcohols having 28 or more carbon atoms. In a further preferred embodiment, the mixture of alcohols contains less than 15 mol-%, more preferred less than 10 mol-% and especially preferred less than 5 mol-% of alcohols having less than 18 carbon atoms. In a specifically preferred embodiment the mixture of alcohols contains less than 15 mol-%, more preferred less than 10 mol-% and especially preferred less than 5 mol-% of alcohols having 26 or more carbon atoms and less than 15 mol-%, more preferred less than 10 mol-% and especially preferred less than 5 mol-% of saturated alcohols having less than 18 carbon atoms.

Preferred saturated fatty alcohols (i) for the esterification of the MAO-copolymer are primary alcohols. Their alkyl radicals $R^3$ are preferably linear or at least substantially linear. Substantially linear means that at least 95 mol-% and especially at least 99 mol-% of the alkyl radicals $R^3$ are linear. Preferred saturated fatty alcohols include 1-octadecanol, 1-eicosanol, 1-docosanol, 1-tetracosanol and their mixtures. They may be of natural or synthetic origin. Fatty alcohol mixtures made from fats and oils as for example behenyl alcohol made from rape seed oil or mustard oil are especially preferred.

Preferred unsaturated fatty alcohols (ii) for the esterification of the MAO-copolymer are primary alcohols. Preferably the alkylene group $R^4$ has 16 to 20 carbon atoms. The alkylene group $R^4$ may contain one or more as for example 2 or 3 C=C double bonds. Preferably $R^4$ contains one C=C double bond. The alkylene radicals $R^4$ are preferably linear or at least substantially linear. Substantially linear means that at least 95 mol-% and especially at least 99 mol-% of the alkyl radicals $R^4$ are linear. Examples for preferred unsaturated fatty alcohols are myristoleyl alcohol, oley alcohol, linoleyl alcohol, linolenyl alcohol, elaeostearyl alcohol, erucyl alcohol and their mixtures. Especially preferred is oleyl alcohol.

In a preferred embodiment, the MAO-copolymer is esterified with 0.6 to 2.2 moles and more preferably with 0.8 to 2.0 moles as for example with 0.6 to 2.0 moles, or with 0.8 to 2.2 moles of the fatty alcohol mixture comprising saturated fatty alcohol (i) and unsaturated fatty alcohol (ii) per mole of polymerized maleic anhydride. Especially preferred are partial esters wherein only part of the maleic acid derived carboxylic acid groups are esterified. In this embodiment the esterification is preferably made with 0.6 to 1.5 moles and preferably with 0.8 to 1.2 moles as for example with 0.6 to 1.2 moles, or with 0.8 to 1.5 moles of fatty alcohol mixture per mole of polymerized maleic anhydride. Preferred partial esters have an acid number of from 30 to 100 mg KOH/g and especially preferred from 35 to 80 mg KOH/g, determined by non-aqueous titration of the sample dissolved in a xylene/2-propanol (1/1) mixture with ethanolic KOH.

Esterification of the MAO-copolymer can be made by procedures well known to those skilled in the art. For example, half esters can be made by heating the MAO-copolymer and the alcohol mixture comprising (i) and (ii) to a temperature of from 40 to 120° C. and preferably from 60° C. to 100° C. for 0.5 to 24 hours. Often the presence of an acidic catalyst has proven to be advantageous. The presence of a catalyst is especially advantageous when complete or at least almost complete esterification is intended. Preferred acid catalysts include Lewis acids, Bronsted acids (including phosphoric acid), organic acids, substantially non-volatile inorganic acids and their partial esters, and heteropolyacids. Particularly suitable esterification catalysts include alkyl, aryl or alkylaryl sulfonic acids, such as for example methane sulfonic acid, naphthalene sulfonic acid, p-toluene sulfonic acid, and dodecyl benzene sulfonic acid. Suitable acids may also include aluminum chloride, boron trifluoride, dichloroacetic acid, hydrochloric acid, iodic acid, phosphoric acid, nitric acid, acetic acid, oxalic acid, stannic chloride, titanium tetraisopropoxide, dibutyltin oxide, and trichloroacetic acid. Similarly, acidic organic and inorganic ion exchange resins have proven to catalyse the esterification.

In a preferred embodiment, the esterification is made in the presence of a solvent. Preferred solvents are aprotic organic solvents such as aliphatic and/or aromatic hydrocarbons. The hydrocarbons may, for example, be saturated aliphatic hydrocarbons or mixtures thereof. These may be either paraffinic or naphthenic, i.e. saturated cyclic, hydrocarbons. The hydrocarbons may also be aromatic hydrocarbons or mixtures thereof as for example toluene, xylene, naphthalene and technical mixtures of aromatic hydrocarbons. Technical grade mixtures of aromatic solvents are commercially available, for example from the Shellsol® A or the Solvesso® series. In a preferred embodiment, the solvent has a boiling point of at least 175° C. and a flashpoint of at least 60° C. Preferably, the amount of solvent, if present, is from 5 to 60 wt.-%, more preferably from 10 to 50 wt.-% and especially preferred from 20 to 40 wt.-% as for example from 5 to 50 wt.-%, from 5 to 40 wt.-%, from 10 to 60 wt.-%, from 10 to 40 wt.-%, from 20 to 60 wt.-% or from 20 to 50 wt.-%, in respect to the sum of MAO-copolymer, fatty alcohols, solvent and any further auxiliaries added to the reaction batch. The solvent used in the esterification step may be the same the solvent as used for the polymerization above, or it may be different. Complete esterification ($R^5$=$R^3$ and/or $R^4$) requires elimination of reaction water which can be achieved for example by azeotropic distillation with an aliphatic or aromatic organic solvent or by stripping the reaction water with a purge of nitrogen @ e.g. 150° C. from high boiling solvents. Preferred complete esters have acid number below 30 mg KOH/g and especially preferred below 20 mg KOH/g.

In a further preferred embodiment, the wax inhibitor according to the various aspects of the invention can be manufactured by esterification of an ethylenically unsaturated dicarboxylic acid or its anhydride with a mixture of alcohols (i) and (ii) prior to its polymerization with the mixture of α-olefins. In this embodiment, the preferred dicarboxylic acids, dicarboxylic acid anhydrides, olefins, alcohols and their molar proportions as well as the reaction conditions for polymerization and esterification are the same as described above for the reverse reaction sequence.

In the use according to the second aspect of the invention and the method according to the third aspect of the invention, the esterified MAO-copolymer can be applied as such. However, for the ease of handling formulations of the esterified MAO-copolymer in an organic solvent are preferred. Preferred solvents are those allowing for a homogeneous dispersion and especially for a homogeneous solution of the esterified MAO-copolymer at least at temperatures above the pour point of the formulation. Preferred organic solvents are selected from alkyl aromatic hydrocarbons, saturated aliphatic hydrocarbons, saturated aliphatic alcohols, and any mixture thereof. Especially preferred solvents are those having a flashpoint above 60° C., since fewer restrictions must be observed for transport and storage of the concentrates when such solvents are used.

A first group of preferred solvents are alkyl aromatic hydrocarbons. Examples for preferred alkyl aromatic hydrocarbons are toluene, ethylbenzene, xylene, diethylbenzene, naphthalene and their mixtures. A second group of preferred solvents are saturated aliphatic hydrocarbons. These may be either paraffinic or naphthenic, i.e. either saturated linear or cyclic hydrocarbons. Examples for preferred saturated aliphatic hydrocarbons include decane, n-undecane, n-dodecane, tetralin, decalin and their mixtures. Especially preferred are technical solvent mixtures such as Shellsol®, Exxsol®, Isopar®, Solvesso® grades, Solvent Naphtha and/or kerosene. In a preferred embodiment, the organic solvent comprises at least 10% by weight, preferably from 20 to 100% by weight, and especially preferred from 30 to 90% by weight, as for example from 10 to 100% by weight, or from 20 to 90% by weight, or from 30 to 100% by weight of alkyl aromatic constituents.

A further group of preferred solvents are saturated aliphatic alcohols having at least eight carbon atoms and esters of saturated aliphatic carboxylic acids and saturated aliphatic alcohols. Examples of suitable alcohols include 1-octanol, 2-ethylhexanol, 1-decanol, 1-dodecanol and iso-tridecanol. Examples of suitable esters include esters of saturated fatty acids having at least eight carbon atoms with saturated aliphatic alcohols, for example methyl laurate or methyl stearate. Technical grade mixtures of different aliphatic esters are commercially available. In a further embodiment of the invention, it is preferred to use esters of aliphatic or cycloaliphatic dicarboxylic acids, for example dialkyl esters of cyclohexane-1,2-dicarboxylic acid such as diisononyl cyclohexane-1,2-dicarboxylate.

Preferred formulations contain from 10 to 99 wt.-%, more preferably from 25 to 95 wt.-% and especially preferred from 50 to 90 wt.-% as for example from 10 to 95 wt.-%, or from 10 to 90 wt.-%, or from 25 to 99 wt.-%, or from 25 to 90 wt.-%, or from 50 to 99 wt.-%, or from 50 to 95 wt.-% of an organic solvent respectively a mixture of organic solvents.

In a preferred embodiment, formulations of the esterified MAO-copolymer according to the invention may comprise one or more further components including but not limited to an antioxidant, a corrosion inhibitor, an asphaltene inhibitor, an additional wax inhibitor that differs in its chemical nature from the polymer compositions of the invention, a wax dispersant, a scale inhibitor, an emulsifier, a dispersant, an emulsion breaker, a gas hydrate inhibitor, a biocide, a pH modifier, and a surfactant. Especially preferred surfactants are anionic surfactants as for example organic sulfonic acids including but not limited to para-toluene sulfonic acid and dodecyl benzenesulfonic acid. These further components may be present from 0 to 10 percent by weight each but not more than 80 percent by weight in total, based on total weight of the composition.

Preferably, the concentration of the esterified MAO-copolymer in formulations is from 1 to 90 wt.-%, more preferably from 5 to 75 wt.-% and especially preferred from 10 to 50 wt.-%, as for example from 1 to 75 wt.-%, or from 1 to 75 wt.-%, or from 5 to 90 wt.-%, or from 5 to 50 wt.-%, or from 10 to 90 wt.-%, or from 10 to 75 wt.-%, based on the sum of all components contained in the formulation.

The wax inhibitor according to the present invention and its formulations have superior low temperature flow and stability properties including a high resistance against gelling and precipitation paired with excellent wax inhibiting performance in hydrocarbon oils. Their wax inhibiting performance in hydrocarbon oils leads to the reduction of one or more of pour point, viscosity, yield stress and/or wax deposition of the oil. They are especially suited for improving the pour point, viscosity, yield stress and/or wax deposition of crude oils and products produced therefrom, for example heating oils, lube oils, bunker oils, residue oils and mineral oils that contain a residue oil. The term crude oil includes all hydrocarbon oils produced by an oil well, including gas condensate and bitumen. Accordingly, the wax inhibitor may be used as an additive in hydrocarbon oil production and transportation for improving the low temperature properties of the oil. The wax inhibitor is particularly effective as a wax inhibitor for waxy crude oils having a saturates content of above 50% and often of above 70% according to SARA analysis. With its balanced performance and low temperature flow properties, this wax inhibitor is splendidly suited for application under temperature and pressure conditions encountered in deepwater operations.

Typically, additized hydrocarbon oils contain from 50 to 10.000 ppm and preferably from 100 to 5.000 ppm, as for example from 50 to 5.000 ppm, or from 100 to 10.000 of the wax inhibitor according to the invention.

Preferably, the wax inhibitor according to the invention is added to the hydrocarbon oil in an amount of 0.005 wt.-% to 1.0 wt.-%, and preferably in an amount of 0.01% to 0.50 wt.-% as for example from 0.005 to 0.50 wt.-%, or from 0.01 to 1.0 wt.-% in order to effectively reduce pour point, viscosity and/or yield stress of the hydrocarbon oil and/or to inhibit wax deposition. Preferably, the wax inhibitor is added to the hydrocarbon oil before the precipitation of waxes has commenced, i.e. at a temperature above the wax appearance temperature. The wax appearance temperature may be determined for example by Differential Scanning calorimetry (DSC).

The point of addition of the wax inhibitor to the crude oil is suitably chosen by the person skilled in the art. The addition can take place, for example, in the formation, in the well, at the wellhead or to a pipeline.

In one embodiment, the wax inhibitor or a formulation thereof is injected into a crude oil pipeline. The injection preferably takes place at the oilfield, i.e. at the start of the crude oil pipeline, but the injection can of course also be affected at another site. For example, the pipeline may be one leading onshore from an offshore platform. The wax inhibitor can prevent blockage of the pipeline when the crude oil cools down during transport in the pipeline. This risk is naturally particularly pronounced when the pipeline is in a cold environment, for example in a deepwater or an Arctic environment.

In a further embodiment of the invention, the wax inhibitor or a formulation thereof is injected into a production well. In one embodiment, the production well may be an offshore production well. The injection can take place, for instance, at the site where oil flows out of the formation into the production well. In this manner, the solidification of the crude oil in the production well and in downstream transport pipelines, an excessive increase in the viscosity thereof and the constriction of pipe cross sections by paraffin deposits can be prevented.

In a specifically preferred embodiment, formulations of the wax inhibitor according to the invention have been successfully applied in deepwater applications where injection in the well or at the wellhead is made via an umbilical. In the oil and gas industry umbilical refers to the connections used offshore between the subsea equipment and platforms or floating production units and enables the control from the surface. This allows, besides others, chemical injection via a flexible string directly into the well. However, with the development of the offshore exploration and production, especially of the deep offshore, the umbilicals are getting longer to reach several kilometres. With the temperature being low and the pressure high, such application requires improved stability of the additives against gelling and precipitation to prevent plugging of the umbilical.

EXAMPLES

The reactants and solvents used for preparation of the wax inhibitors (WI) are characterized in tables 1a, 1b and 1c. They were all technical grade if not indicated otherwise. The composition of α-olefins and fatty alcohols was determined by GC. The obtained contents of α-olefins respectively fatty alcohols in wt.-% were converted to molar % by multiplying the individual components' content in the sample with its molecular weight and relating its molar content to the sum of the contents of all α-olefins respectively fatty alcohols in the sample.

The molecular weights of the intermediate MAO-copolymers were determined via gel permeation chromatography in THF against poly(styrene) standards. The polydispersity PDI is determined by the quotient Mw/Mn.

Acid numbers of the intermediate MAO-copolymers as well as acid numbers of the esterified wax inhibitors were determined by potentiometric titration of the reaction products upon further dilution with xylene/2-propanol=1/1 (v/v) mixture. Therefore, an aliquot of the reaction batch was weighed into a 150 ml-beaker and dissolved with about 80 ml of xylene/2-propanol=1/1 (v/v) mixture. In an automated titroprocessor (Metrohm Titrando 907) equipped with an electrode for non-aqueous acid/base titrations (Metrohm Nr. 6.0203.300) this solution was titrated with potassium hydroxide volumetric solution in ethanol, c=0.1 mol/l up to the equivalence point.

The dry matter of MAO-copolymers and wax inhibitors was determined by drying the polymer solutions in a vacuum oven whereby the dry matter is the part of the tested solution in percent per weight which remains in the drying dish after drying for 4 hours at 170° C. and 20 mbar.

Pour points were measured according to ISO 3016.

All percent values are given in percent by weight unless otherwise specified.

TABLE 1a

Composition of alpha-olefins (AO) used as raw materials (main components; mol-%)

| Olefin | AO1 | AO2 | AO 3 | AO4 |
|---|---|---|---|---|
| ≤$C_{18}H_{36}$ | 1.2 | | | |
| $C_{20}H_{40}$ | 44.1 | 45.0 | | |
| $C_{22}H_{44}$ | 34.2 | 26.2 | | |
| $C_{24}H_{48}$ | 19.5 | 14.9 | | |
| $C_{26}H_{52}$ | 0.9 | 5.5 | | 0.1 |
| $C_{28}H_{56}$ | | 3.3 | 5.9 | 9.8 |
| $C_{30}H_{60}$ | | 2.1 | 28.0 | 25.4 |
| $C_{32}H_{64}$ | | 1.2 | 20.8 | 18.5 |
| $C_{34}H_{68}$ | | 0.7 | 14.3 | 13.1 |
| $C_{36}H_{72}$ | | 0.5 | 9.7 | 9.4 |
| $C_{38}H_{76}$ | | 0.3 | 6.7 | 6.6 |
| $C_{40}H_{80}$ | | 0.2 | 4.8 | 4.7 |
| $C_{42}H_{84}$ | | 0.1 | 3.3 | 3.3 |
| $C_{44}H_{88}$ | | 0.1 | 2.3 | 2.3 |
| $C_{46}H_{92}$ | | | 1.5 | 1.6 |
| $C_{48}H_{96}$ | | | 1.0 | 3.3 |
| $C_{50}H_{100}$ | | | 0.7 | 1.2 |
| $C_{52}H_{104}$ | | | 0.4 | 0.9 |
| $C_{54}H_{108}$ | | | 0.3 | 0.6 |
| $C_{56}H_{112}$ | | | 0.2 | 0.4 |
| $C_{58}H_{116}$ | | | 0.1 | 0.2 |
| $C_{60}H_{120}$ | | | 0.1 | 0.1 |
| $C_{62}H_{124}$ | | | 0.04 | 0.1 |
| $C_{64}H_{128}$ | | | 0.03 | 0.1 |
| $C_{66}H_{132}$ | | | 0.02 | 0.1 |
| Σ($C_{30+}$) | 0.0 | 5.2 | 94.1 | 90.0 |
| Average MW | 301.2 g/mol | 312 g/mol | 477 g/mol | 481 g/mol |

TABLE 1b

Composition of saturated fatty alcohols (LA) used (mol-%)

| | LA1 | LA2 | LA3 | LA4 | LA5 |
|---|---|---|---|---|---|
| $C_{16}H_{33}$—OH | 98 | | | 26.2 | 55.6 |
| $C_{18}H_{37}$—OH | | 7.1 | | 33.0 | 4.1 |
| $C_{20}H_{41}$—OH | | 14.1 | | 30.7 | 6.2 |
| $C_{22}H_{45}$—OH | | 78.5 | | 7.7 | 34.0 |
| $C_{24}H_{49}$—OH | | 0.2 | 11.9 | 2.4 | 0.1 |
| $C_{26}H_{53}$—OH | | | 35.0 | | |
| $C_{28}H_{57}$—OH | | | 8.1 | | |
| $C_{30}H_{61}$—OH | | | 21.2 | | |
| $C_{32}H_{65}$—OH | | | 12.1 | | |
| $C_{34}H_{69}$—OH | | | 6.6 | | |
| $C_{36}H_{73}$—OH | | | 3.5 | | |
| $C_{38}H_{77}$—OH | | | 1.6 | | |
| Average MW | 271 g/mol | 260 g/mol | 390 g/mol | 259 g/mol | 262 g/mol |

TABLE 1c

Characterization of further raw materials used

| | |
|---|---|
| AO5 | A mixture of 99.9 mol-% 1-dodecene and 0.1 mol % 1-tetradecene |
| OA1 | Oleyl alcohol, comprising as main components |
| | Oleyl alcohol     76 wt.-%     (75.3 mol-%) |
| | Myristyl alcohol     4 wt.-%     ( 5.0 mol-%) |

TABLE 1c-continued

| | Characterization of further raw materials used |
|---|---|
| | Cetyl alcohol 18 wt.-% (19.7 mol-%) Mean molecular weight approximately 260 g/mol |
| OA2 | Oleyl alcohol, analytical grade, 98%, Mw = 268.5 g/mol |
| Cyclohexanol | Cyclohexanol, analytical grade |
| 2-EH | 2-Ethylhexanol, analytical grade |
| ISOFOL ® 32 | Tetradecyloctadecanol ($C_{32}$ Guerbet alcohol) obtained from Sasol |
| Solvesso 100D | Aromatic fluid produced from petroleum-based raw materials having an aromatic content of at least 99%. It is composed primarily of $C_9$-$C_{10}$ dialkyl and trialkylbenzenes (from Shell). |
| Aromatic 150 | High flash (63° C.) aromatic naphtha, produced from petroleum-based raw materials. Consists essentially of $C_{10}$ aromatic hydrocarbons (from Exxon). |
| Xylene | Mixture of xylene isomers, including ethylbenzene |
| p-Tss | para-toluenesulfonic acid |
| DTBP | Di-tert-butyl peroxide |
| MSA | Methane sulfonic acid |
| MAH | Maleic anhydride |
| DDBSA | Dedecylbenzenesulfonic acid |

General Method for the Preparation of Maleic Anhydride α-Olefin Copolymers MAO 1 to MAO 11:

A 1 L five neck glass reactor equipped with overhead agitator, reflux condenser, nitrogen inlet, thermo couple, heating bath and peristaltic pump, was charged with maleic anhydride, the α-olefins and the solvent in the ratios given in table 2, wherein the share of solvent in the reaction batch was 40 wt.-%, if not indicated otherwise. The mixture was heated to 135° C. and rendered inert by flushing with 100 L/h nitrogen subsurface purge for 30 minutes while heating. After reaching the targeted temperature, the nitrogen flow was reduced to 10 L/h and applied above the surface of the reaction mixture. Di-tert-butylperoxide was dosed continuously over four hours whereby the temperature was maintained at 135° C. to 140° C. Subsequently, the reaction mixture was stirred at 137±3° C. for a further three hours. Further details for the syntheses of MAO polymers 1 to 11 are given in table 2. The molar shares of the α-olefins used for synthesis of MAO 1 to 11 and the resulting contents of α-olefins having 30 or more carbon atoms are given in table 3 together with selected properties of the MAO-copolymers 1 to 11 thus produced.

TABLE 2

Synthesis of MAO-copolymers (MAO 1 to MAO 11)

| MAO | MAH [mol] | α-olefin (I) grade | [mol] | α-olefin (II) grade | [mol] | DTBP [mol] | Solvent |
|---|---|---|---|---|---|---|---|
| 1 | 1.43 | AO1 | 0.57 | AO3 | 0.42 | 0.046 | Solvesso 100D |
| 2 | 1.43 | AO2 | 0.57 | AO3 | 0.66 | 0.046 | Solvesso 100D |
| 3 | 1.43 | AO1 | 0.57 | AO4 | 0.66 | 0.046 | Xylene |
| 4 | 0.56 | AO2 | 0.40 | AO3 | 0.26 | 0.019 | Solvesso 100D |
| 5 | 0.56 | AO2 | 0.28 | AO3 | 0.20 | 0.018 | Solvesso 100D |
| 6 | 0.56 | AO2 | 0.33 | AO3 | 0.15 | 0.018 | Solvesso 100D |
| 7 | 0.56 | AO2 | 0.38 | AO3 | 0.10 | 0.018 | Aromatic 150 |
| 8 | 0.56 | AO2 | 0.43 | AO3 | 0.09 | 0.018 | Solvesso 100D |
| 9 | 0.56 | AO2 | 0.48 | — | — | 0.018 | Solvesso 100D |
| 10 (comp.) | 1.43 | AO1 | 1.43 | — | — | 0.029 | — |
| 11 (comp.) | 0.67 | AO5 | 0.72 | — | — | 0.034* | Aromatic 150 (25 wt.-%) |

MAO 10 is a comparative example according to WO 2017/089212, Copolymer 1 (polymerized in substance)
MAO 11 is a comparative example according to WO 2018/190917, Experiment 9 (polymerized in Aromatic 150).
*The initiator used here is dicumyl peroxide.

TABLE 3

Calculation of the share of α-olefins having 30 and more carbon atoms and selected properties of MAO-copolymers MAO 1 to MAO 11

| | α-Olefins | | | | | Copolymer | | |
|---|---|---|---|---|---|---|---|---|
| | α-olefin (I) | | α-olefin (II) | | α-olefins ≥ C30 | Acid number | GPC | |
| MAO | mol % | grade | mol % | grade | [mol %] | [mg KOH/g] | Mw [Da] | PDI |
| 1 | 57.6 | AO1 | 42.4 | AO3 | 39.9 | 147 | 11.000 | 1.95 |
| 2 | 46.3 | AO1 | 53.7 | AO3 | 50.5 | 148 | 10.800 | 1.93 |
| 3 | 46.3 | AO1 | 53.7 | AO4 | 50.5 | 146 | 13.800 | 2.16 |
| 4 | 60.6 | AO2 | 39.4 | AO3 | 40.2 | 133 | 10.860 | 1.63 |

TABLE 3-continued

Calculation of the share of α-olefins having 30 and more carbon atoms and selected properties of MAO-copolymers MAO 1 to MAO 11

| | α-Olefins | | | | | Copolymer | | |
|---|---|---|---|---|---|---|---|---|
| | α-olefin (I) | | α-olefin (II) | | α-olefins ≥ C30 | Acid number | GPC | |
| MAO | mol % | grade | mol % | grade | [mol %] | [mg KOH/g] | Mw [Da] | PDI |
| 6 | 68.8 | AO2 | 31.3 | AO3 | 33.0 | 140 | 8.650 | 1.56 |
| 8 | 82.7 | AO2 | 17.3 | AO3 | 20.6 | 129 | 7.300 | 1.69 |
| 9 | 100.0 | AO2 | 0.0 | — | 5.2 | 149 | 6.400 | 1.65 |
| 10 (comp.) | 100.0 | AO1 | 0.0 | — | — | 214 | 10.800 | 2.23 |
| 11 (comp.) | 100.0 | AO5 | 0.0 | — | — | 223 | 5.200 | 2.41 |

General Method for the Preparation of Wax Inhibitors WI 1 to WI 40 by Esterification of Maleic Anhydride α-Olefin Copolymers MAO 1 to MAO 11:

A five neck glass reactor equipped with overhead agitator, reflux condenser, nitrogen inlet, thermocouple and heating bath, was charged with part of the MAO-copolymer as obtained from the polymerization reaction together with the mixture of alcohols as specified in table 4, together with solvent (Solvesso 100D, Aromatic 150 or xylene, all at 55 wt.-% of the reaction batch) and acidic catalyst (p-toluene sulfonic acid or methane sulfonic acid).

For manufacturing of wax inhibitors WI 1 to WI 19 (except WI 9 and WI 13), the batches were heated under a blanket of nitrogen to 95±2° C. and stirred at this temperature for 5 hours.

For manufacturing of wax inhibitors WI 9 and WI 13, the reflux condenser was substituted by a Dean-Stark trap. The batches were heated under a blanket of nitrogen to 140±5° C. and stirred at this temperature for 5 h while removing the water formed.

The amounts of alcohols used for the esterification of MAO 1 to MAO 11 to give wax inhibitors WI 01 to WI 19 given in table 4 are molar equivalents in respect to the moles of maleic anhydride used for manufacturing the respective MAO-copolymer. The portion of the unsaturated alcohol given in table 4 is calculated from the amount of alcohols used and their composition according to tables 1b and 1c.

TABLE 4

Alcohols and their molar equivalents reacted per mole of MAH incorporated in the respective MAO-copolymer for preparation of the wax inhibitors WI 1 to WI 19 and selected characteristics of the obtained wax inhibitors WI 1 to WI 19

| | | Alcohol | | | | | Esterified polymer | | |
|---|---|---|---|---|---|---|---|---|---|
| | | alcohol I | | alcohol II | | unsaturated | Acid number | Mw | Pour Point |
| WI | MAO | [mol eq.] | [grade] | [mol eq.] | [grade] | [mol-%] | [mg KOH/g] | [Da] | 40% act. [° C.] |
| 1 | 1 | 1.04 | LA2 | 0.07 | OA1 | 4.8 | 45.9 | 22600 | 18 |
| 2 | 1 | 0.96 | LA2 | 0.12 | OA1 | 8.4 | 50.3 | 20700 | 15 |
| 3 | 1 | 1.00 | LA2 | 0.09 | OA1 | 6.3 | 40.7 | 19100 | 15 |
| 4 | 1 | 0.77 | LA2 | 0.23 | OA1 | 17.5 | 42.0 | 19000 | 12 |
| 5 | 2 | 0.97 | LA2 | 0.12 | OA1 | 8.4 | 47.1 | 19800 | 15 |
| 6 | 2 | 0.78 | LA2 | 0.23 | OA1 | 17.3 | 45.3 | 19800 | 15 |
| 7 | 3 | 0.78 | LA2 | 0.24 | OA1 | 17.9 | 44.6 | 26700 | 12 |
| 8 | 2 | 0.71 | LA2 | 0.34 | OA2 | 31.7 | 48.3 | 10300 | 9 |
| 9 | 4 | 1.53 | LA2 | 0.48 | OA1 | 17.9 | 8.7 | 16800 | 15 |
| 10 | 4 | 0.75 | LA2 | 0.23 | OA1 | 17.8 | 46.3 | 13700 | 15 |
| 11 | 6 | 0.81 | LAS | 0.24 | OA1 | 17.4 | 46.5 | 13000 | 12 |
| 12 | 8 | 0.77 | LA2 | 0.23 | OA1 | 17.5 | 45.6 | 10900 | 15 |
| 13 | 9 | 1.41 | LA3 | 0.39 | OA1 | 16.6 | 12.7 | 14200 | 12 |
| 14 | 9 | 0.77 | LA2 | 0.23 | OA1 | 17.5 | 46.7 | 10400 | 12 |
| 15 (comp.) | 9 | 0.65 | LA2 | — | — | — | 47.4 | 18900 | 24 |
| 16 (comp.) | 10 | 0.60 | LA4 | 0.40 | 2-EH | — | 49.3 | 15900 | 9 |
| 17 (comp.) | 10 | 0.60 | LA4 | 0.40 | Cyclohexanol | — | 48.8 | 16200 | 9 |
| 18 (comp.) | 11 | 1.16 | LA3 | 0.17 | Oleyl alcohol | 12.8 | 31.4 | 7100 | 15 |
| 19 (comp.) | 1 | 0.92 | LA2 | 0.00 | — | — | 46.8 | 17.200 | 24 |

Wax inhibitors WI 16 and WI 17 are comparative examples according to WO 2017/089212.
WI 18 is a comparative example according to WO 2018/190917, example 9.
WI 19 is a comparative example according to GB 1245879.

TABLE 5

Molar equivalents in respect to maleic anhydride of alpha olefins and alcohols used for preparation of wax inhibitors WI 20 and 21

| | α-olefins | | | | | Alcohols | | | | unsatu-rated | Acid Number | GPC | | Pour Point 40% act. |
|---|---|---|---|---|---|---|---|---|---|---|---|---|---|---|
| | α-olefin (I) | | α-olefin (II) | | share ≥ C30 | alcohol 1 | | alcohol 2 | | | | | | |
| WI | mol % | grade | mol % | grade | [mol %] | [mol eq.] | [grade] | [mol eq.] | [grade] | [mol-%] | [mg KOH/g] | Mw [Da] | PDI | [° C.] |
| 20 | 91.3 | AO2 | 8.7 | AO3 | 12.9 | 0.63 | LA2 | 0.31 | OA1 | 21.8% | 73.6 | 15900 | 2.06 | 12 |
| 21 | 45.5 | AO1 | 54.5 | AO3 | 51.2 | 0.63 | LA2 | 0.31 | OA1 | 21.8% | 71.9 | 11700 | 1.87 | 15 |

The share of α-olefins ≥C30 is calculated from the composition of the individual α-olefin grades used General Method for the Preparation of Wax Inhibitors WI 20 and WI 21 by Esterification of Maleic Anhydride with a Mixture of Alcohols and Subsequent Copolymerization with α-olefins:

A 1 L five neck glass reactor equipped with overhead agitator, reflux condenser, nitrogen inlet, thermo couple, heating bath and peristaltic pump, was charged with maleic anhydride, the α-olefins, the alcohols, and xylene in the ratios given in table 5, wherein the share of xylene in the reaction batch was 20 wt.-%. The mixture was heated to 135° C. and rendered inert by flushing with 80 L/h nitrogen subsurface purge for 30 minutes while heating. The reaction mixture is stirred at this temperature for 5 h until esterification is complete as indicated by constant acid number. Subsequently, di-tert-butylperoxide was dosed continuously over six hours whereby the temperature was maintained at 135° C. to 140° C. Subsequently, the reaction mixture was stirred at 145±5° C. for a further 10 hours.

The pour points of the wax inhibitors WI 1 to WI 21 given in tables 4 and 5 were determined upon dilution of the polymeric esters with xylene to a polymer content of 40 wt.-%.

The wax inhibiting performance of the polymers according to the invention was determined by their pour point depression of various waxy crude oils. The characterization of the crude oils is given in table 6. SARA analysis was made by Iatroscan TLC-FID according to IP 469.

TABLE 6

Characterization of crude oils according to SARA

| | crude oil A | crude oil B | crude oil C | crude oil D |
|---|---|---|---|---|
| S(aturates) | 72% | 76% | 78% | 71% |
| A(romatics) | 16% | 10% | 15% | 15% |
| R(esins) | 6% | 10% | 6% | 4% |
| A(spalthenes) | 6% | 4% | 1% | 10% |
| Pour Point | 30° C. | 24° C. | 30° C. | 27° C. |

The pour point depression of the wax inhibitors was determined by ASTM D5853. 2,000 ppm of the 40% active inhibitor formulations were dosed into the in crude oils A, B, C respectively D at an oil temperature of 80° C. The automatic pour point measurements were started at a temperature 9° C. above the crude oil pour point. Table 7 shows the pour points obtained upon addition of the various wax inhibitors.

TABLE 7

Pour points obtained with WI 1 to 21 in different crude oils

| WI | Crude Oil A | Crude Oil B | Crude Oil C | Crude Oil D |
|---|---|---|---|---|
| none (blank) | 30 | 24 | 30 | 27 |
| 1 | 15 | 15 | 12 | 15 |
| 2 | 15 | 18 | 18 | 18 |
| 3 | 15 | 18 | 15 | 15 |
| 4 | 15 | 18 | 18 | 18 |
| 5 | 15 | 15 | 15 | 15 |
| 6 | 15 | 15 | 15 | 15 |
| 7 | 18 | 18 | 15 | 18 |
| 8 | 18 | 18 | 18 | 18 |
| 9 | 15 | 15 | 12 | 18 |
| 10 | 15 | 15 | 15 | 18 |
| 11 | 18 | 15 | 18 | 18 |
| 12 | 15 | 15 | 15 | 18 |
| 13 | 15 | 15 | 12 | 18 |
| 14 | 15 | 15 | 15 | 15 |
| 20 | 15 | 18 | 15 | 18 |
| 21 | 12 | 15 | 15 | 15 |
| 15 (comp.) | 21 | 21 | 24 | 24 |
| 16 (comp.) | 21 | 21 | 27 | 24 |
| 17 (comp.) | 21 | 21 | 30 | 21 |
| 18 (comp.) | 30 | 21 | 30 | 24 |
| 19 (comp.) | 12 | 15 | 12 | 15 |

Taken together, the pour points of the 40% active wax inhibitor formulations given in tables 4 and 5 and the pour point reductions achieved in the various crude oils (table 7) show a superior combination of cold flow behavior and pour point depression of the wax inhibitors according to the invention in comparison to the wax inhibitors according to the state of the art.

Assessment of Suitability for Application at Deepwater Conditions

For being suited for use in deepwater applications, a wax inhibitor formulation needs to remain flowable at temperatures down to 4° C. or below. Additionally, for application via an umbilical, it shall not form a precipitate which may block the line. For assessment of suitability for such application, wax inhibitor formulations containing 25 wt.-% of a wax inhibitor in xylene were stored in a fridge at 4° C. After storage for 24 h, the samples were inspected visually (vis. app.) for turbidity as a measure for precipitates. Additionally, they were tilted 90° for assessment of their flowability. The results are given in table 8.

TABLE 8

Assessment of the wax inhibitors' flowability and visual appearance upon storage at 4° C. for 24 hours

| | Before test @ 22° C. | | After 24 h storage @ 4° C. | |
|---|---|---|---|---|
| WI | Flowability | Vis. app. | Flowability | Vis. app. |
| 2 | Liquid | Clear | Liquid | Clear |
| 8 | Liquid | Clear | Liquid | Clear |
| 20 | Liquid | Clear | Liquid | Clear |
| 21 | Liquid | Clear | Liquid | Clear |
| 16 (Comp) | Liquid | Clear | Liquid | Clear |
| 19 (Comp) | Liquid | Clear | Solid | Turbid |

At ambient, all wax inhibitors tested were homogeneous liquids in 25% active solution. Upon storage at 4° C. all wax inhibitors according to the invention remained clear liquids. In contrast, comparative WI 19 was a waxy solid while; WI 16 while also being liquid and clear, showed insufficient pour point depression when added to test oils A, C, D and E (see Table 7).

For application in regions with cold climate and/or during wintertime, wax inhibitor formulations need to remain pumpable at changing temperatures, e.g. repeatedly changing from ambient to well below the freezing point. For concentrated wax inhibitor formulations according to the state of the art this often poses a problem.

For testing the cold temperature change stability, 7 wt.-% active solutions of different wax inhibitors in xylene were prepared by stirring the wax inhibitor in xylene for ½ hours at 60° C. The thus obtained formulations were stored in a programmable cold chamber at 22° C., cooled to −12° C., thawed to 22° C. and subsequently cooled to −12° C. according to the following scheme:

Interval i: 6 hours at 22±1° C.
Interval ii: 16 hours at −12±0.5° C.
Interval iii: 6 hours at 22±1° C.
Interval iv: 16 hours at −12±0.5° C.

At the end of each interval the samples were inspected visually (vis. app.) for turbidity as a measure for precipitates and they were tilted 90° for assessment of their flowability. The results are shown in table 9.

The wax inhibitors according to the invention remained liquid and clear or at least slightly hazy (WI2) through the cold cycles. In contrast, comparative WI 16 gelled during the second cold cycle and WI 19 solidified at −12° C. and remained cloudy after the first thawing.

TABLE 9

Assessment of cold temperature change stability of wax inhibitor formulations

| | Interval i (22° C.) | | Interval ii (−12° C.) | | Interval iii (22° C.) | | Interval iv (−12° C.) | |
|---|---|---|---|---|---|---|---|---|
| WI | Flowability | Vis. App. | Flowability | Vis. App. | Flowability | Vis. App. | Flowability | Vis. App. |
| 2 | Liquid | Clear | Liquid | Slightly hazy | Liquid | Clear | Liquid | Slightly hazy |
| 8 | Liquid | Clear | Liquid | Clear | Liquid | Clear | Liquid | Clear |
| 20 | Liquid | Clear | Liquid | Clear | Liquid | Clear | Liquid | Clear |
| 21 | Liquid | Clear | Liquid | Clear | Liquid | Clear | Liquid | Clear |
| 16 (Comp) | Liquid | Clear | Viscous Liquid | Clear | Liquid | Clear | Gel | Clear |
| 19 (Comp) | Liquid | Clear | Solid | Turbid | Liquid | Cloudy | Solid | Turbid |

The invention claimed is:

1. A wax inhibitor for hydrocarbon oils comprising an esterified copolymer having repeating structural units derived from an esterified ethylenically unsaturated dicarboxylic acid and at least one α-olefin having at least 18 carbon atoms, whereof at least 3 mol-% of the at least one α-olefin has 30 or more carbon atoms, and wherein the ethylenically unsaturated dicarboxylic acid has been esterified with a mixture of fatty alcohols comprising
   i) 70 to 97 mol-% of a saturated fatty alcohol having 18 to 24 carbon atoms and
   ii) 3 to 30 mol-% of an unsaturated fatty alcohol having 16 to 24 carbon atoms.

2. The wax inhibitor according to claim 1, wherein the at least one α-olefin is a mixture of α-olefins having from 18 to 50 carbon atoms.

3. The wax inhibitor according to claim 2, wherein the mixture of α-olefins contains from 3 to 60 wt.-% of α-olefins having 30 and more carbon atoms.

4. The wax inhibitor according to claim 2, wherein mixture of α-olefins comprises at most 10 wt.-% α-olefins having 18 or less carbon atoms.

5. The wax inhibitor according to claim 1, wherein the ethylenically unsaturated dicarboxylic acid is selected from the group consisting of maleic acid, fumaric acid, and maleic anhydride.

6. The wax inhibitor according to claim 1, wherein the mixture of fatty alcohols used for the esterification of the copolymer contains less than 15 mol-% of fatty alcohols having 26 or more carbon atoms.

7. The wax inhibitor according to claim 1, wherein the mixture of fatty alcohols used for the esterification of the copolymer contains less than 7 mol-% of saturated fatty alcohols having 28 or more carbon atoms.

8. The wax inhibitor according to claim 1, wherein the mixture of fatty alcohols used for the esterification of the copolymer contains less than 15 mol-% of fatty alcohols having less than 18 carbon atoms.

9. The wax inhibitor according to claim 1, wherein the saturated fatty alcohol is selected from the group consisting of 1-octadecanol, 1-eicosanol, 1-docosanol, 1-tetracosanol and their mixtures.

10. The wax inhibitor according to claim 1, wherein the unsaturated fatty alcohol is selected from the group consisting of oleyl alcohol, linoleyl alcohol, linolenyl alcohol, elaeostearyl alcohol, erucyl alcohol and their mixtures.

11. The wax inhibitor according to claim 1, wherein the unsaturated fatty alcohol is oleyl alcohol.

12. The wax inhibitor according to claim 1, wherein the copolymer is esterified with 0.6 to 2.2 moles of the mixture of fatty alcohols comprising saturated fatty alcohol (i) and unsaturated fatty alcohol (ii) per mole of polymerized ethylenically unsaturated dicarboxylic acid.

13. The wax inhibitor according to claim 1, wherein the copolymer comprises one or more of the repeating structural units of formula (2) and/or (3)

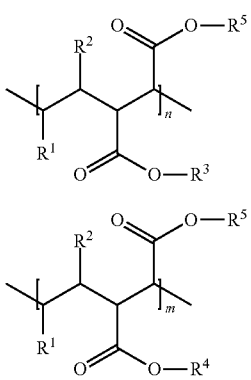

(2)

(3)

wherein
one of $R^1$ or $R^2$ is hydrogen, and the other one is selected from the group consisting of alkyl groups containing at least 16 carbon atoms, and wherein at least 3 mol-% of the alkyl groups have 28 or more carbon atoms, n is an integer ranging from 2 to 98, m is an integer ranging from 2 to 98, n+m is an integer from 5 to 100, $R^3$ is an alkyl group having 18 to 24 carbon atoms, $R^4$ is an alkenyl group having 16 to 24 carbon atoms, and $R^5$ is selected from the group consisting of hydrogen, $R^3$ and $R^4$, wherein the molar portion of the groups $R^4$ in respect to the sum of the groups $R^3$ and $R^4$ is between 3 and 30 mol-% and the molar portion of the groups $R^3$ in respect to the sum of the groups $R^3$ and $R^4$ is between 97 and 70 mol-%.

14. The wax inhibitor according to claim 1, wherein the copolymer additionally comprises up to 30 mol-% of repeating structural units (4) and/or (5)

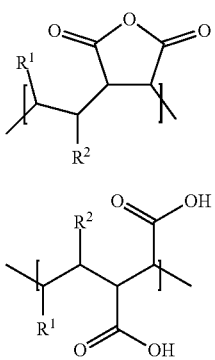

(4)

(5)

wherein
one of $R^1$ or $R^2$ is hydrogen, and the other one is selected from alkyl groups containing at least 16 carbon atoms, and wherein at least 3 mol-% of the alkyl groups have 28 or more carbon atoms.

15. The wax inhibitor according to claim 1, wherein the copolymer additionally comprises further comonomers selected from the group consisting of esters of acrylic acid or methacrylic acid, vinyl alkanoates, allyl compounds, vinyl ethers, N-vinyllactams, N-vinylimidazoles, ethylenically unsaturated aromatics, and mixtures thereof.

16. The wax inhibitor according to claim 15, wherein the copolymer contains from 0.1 to 30 mol-% of the further comonomer, in respect to the content of α-olefin, esterified unsaturated dicarboxylic acid and the further monomer(s) in the copolymer.

17. The wax inhibitor formulation comprising from 1 to 90 wt.-% of a copolymer according to claim 1 and from 10 to 99 wt.-% of an organic solvent.

18. A hydrocarbon oil composition comprising an effective amount of at least one wax inhibitor according to claim 1.

19. The hydrocarbon oil composition according to claim 18, wherein the hydrocarbon oil contains from 0.005 to 1.0 wt.-% of the wax inhibitor.

20. The hydrocarbon oil composition according to claim 18, wherein the hydrocarbon oil is crude oil, or a product produced therefrom.

21. The hydrocarbon oil composition according to claim 18, wherein the oil has a saturates content of 50% or above as determined by SARA analysis.

22. A method for reducing one or more of pour point, viscosity, yield stress and/or wax deposition of a hydrocarbon oil comprising the step of adding at least one wax inhibitor for hydrocarbon oils comprising an esterified copolymer having repeating structural units derived from an esterified ethylenically unsaturated dicarboxylic acid and at least one α-olefin having at least 18 carbon atoms, whereof at least 3 mol-% of the at least one α-olefin has 30 or more carbon atoms, and wherein the ethylenically unsaturated dicarboxylic acid has been esterified with a mixture of fatty alcohols comprising
i) 70 to 97 mol-% of a saturated fatty alcohol having 18 to 24 carbon atoms and
ii) 3 to 30 mol-% of an unsaturated fatty alcohol having 16 to 24 carbon atoms, to the hydrocarbon oil.

23. A process for manufacturing a wax inhibitor, wherein maleic anhydride and α-olefins having at least 18 carbon atoms, wherein at least 3 mol-% of the α-olefins have 30 or more carbon atoms, are copolymerized in the presence of a free radical chain initiator and the copolymer is subsequently esterified with a mixture of fatty alcohols comprising
i) 70 to 97 mol-% of a saturated fatty alcohol having 18 to 24 carbon atoms and
ii) 3 to 30 mol-% of an unsaturated fatty alcohol having 16 to 24 carbon atoms.

24. A process for manufacturing a wax inhibitor, wherein maleic anhydride is esterified with a mixture of fatty alcohols comprising
i) 70 to 97 mol-% of a saturated fatty alcohol having 18 to 24 carbon atoms and
ii) 3 to 30 mol-% of an unsaturated fatty alcohol having 16 to 24 carbon atoms and is subsequently copolymerized in the presence of a radical chain initiator with α-olefins having at least 18 carbon atoms, whereof at least 3 mol-% of the α-olefins have 30 or more carbon atoms.

25. Method of reducing the pour point and/or the viscosity of a wax inhibitor which is a copolymer having repeating structural units derived from an ethylenically unsaturated dicarboxylic acid or its anhydride and α-olefins having at least 18 carbon atoms, whereof at least 3 mol-% of the α-olefins have 30 or more carbon atoms, wherein prior to esterification of the ethylenically dicarboxylic acid, its anhydride and/or the copolymer with a saturated fatty alcohol having 18 to 24 carbon atoms 70 to 97 mol-% of the saturated fatty alcohol having 18 to 24 carbon atoms is admixed with 3 to 30 mol-% of an unsaturated fatty alcohol having 16 to 24 carbon atoms.

\* \* \* \* \*